No. 611,280. Patented Sept. 27, 1898.
C. G. & J. J. ROBERTON.
TIRE.
(Application filed July 7, 1897.)
(No Model.) 3 Sheets—Sheet 2.
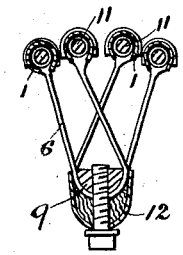
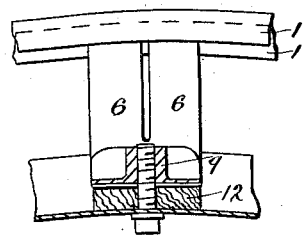
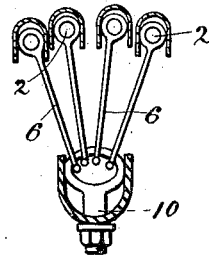
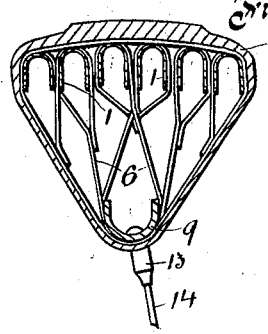
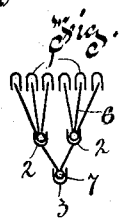
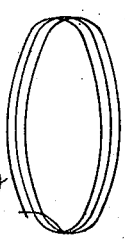
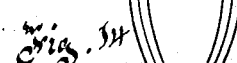
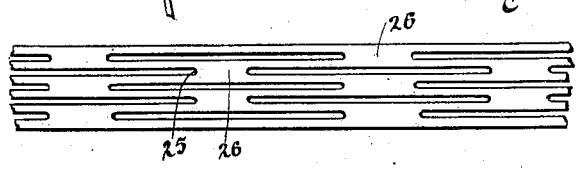
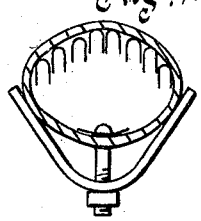
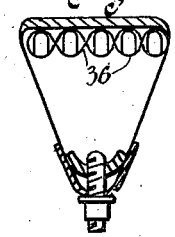
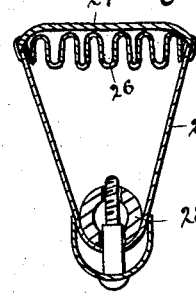
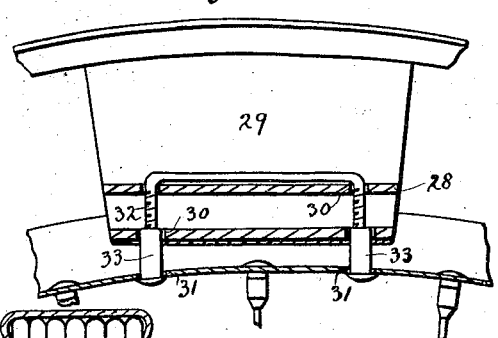
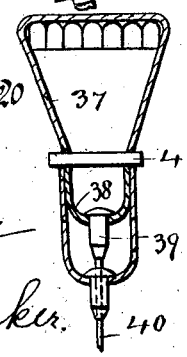
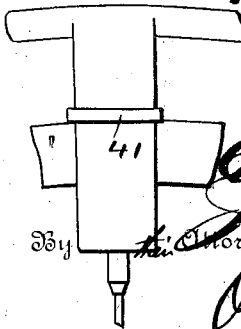

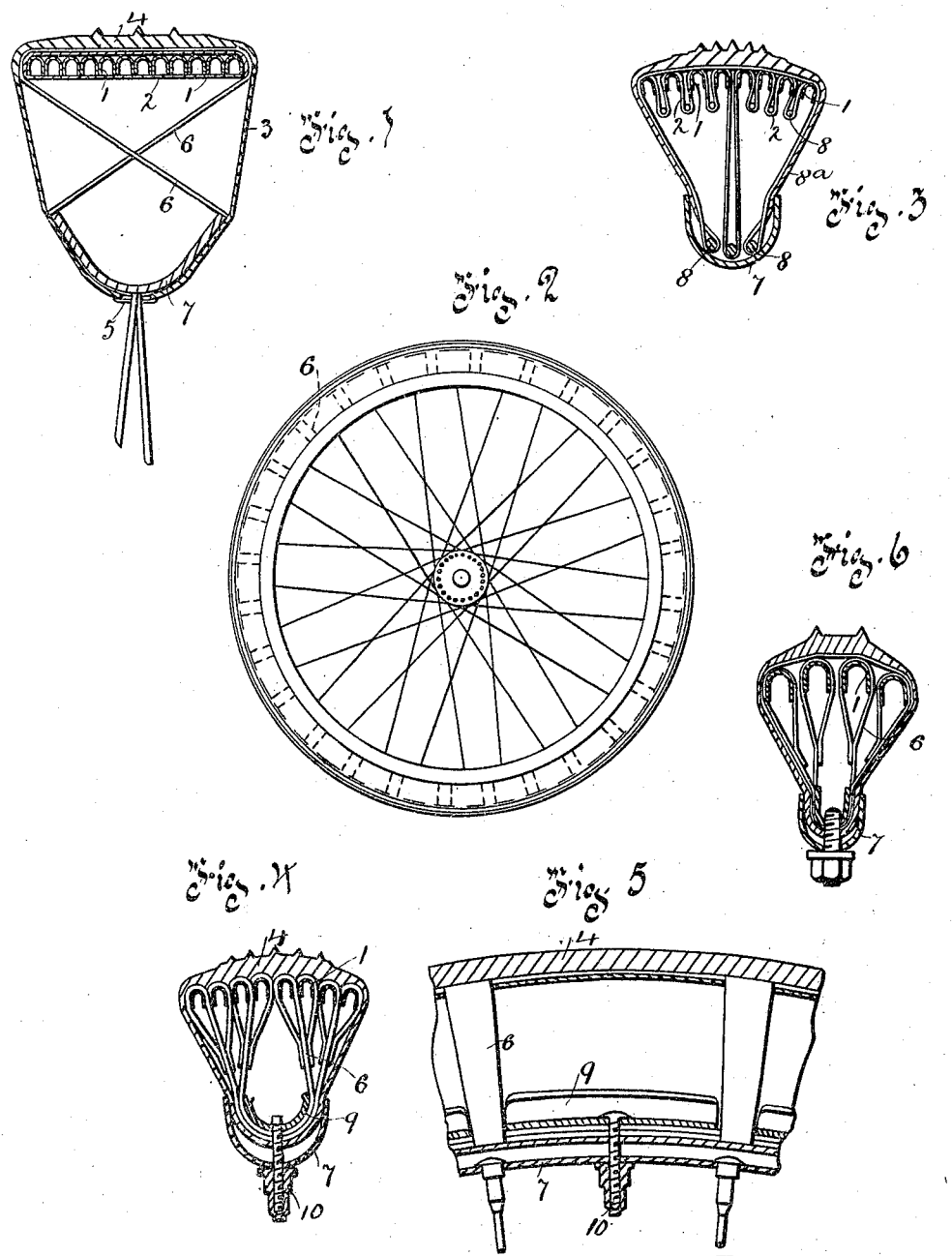

No. 611,280. Patented Sept. 27, 1898.
C. G. & J. J. ROBERTON.
TIRE.
(Application filed July 7, 1897.)
(No Model.) 3 Sheets—Sheet 3.
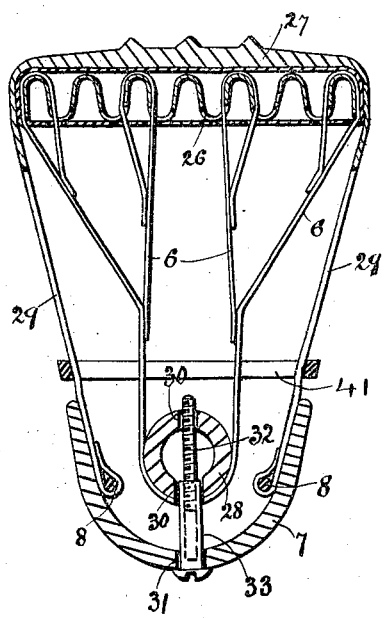

UNITED STATES PATENT OFFICE.

CHARLES GEORGE ROBERTON, OF GLASGOW, SCOTLAND, AND JAMES JACKSON ROBERTON, OF LEEDS, ENGLAND, ASSIGNORS OF ONE-THIRD TO GEORGE E. ROBERTON, OF MONTREAL, CANADA.

TIRE.

SPECIFICATION forming part of Letters Patent No. 611,280, dated September 27, 1898.

Application filed July 7, 1897. Serial No. 643,720. (No model.)

*To all whom it may concern:*

Be it known that we, CHARLES GEORGE ROBERTON, of the city of Glasgow, in the county of Lanark, Scotland, and JAMES JACK-SON ROBERTON, of the city of Leeds, in the county of York, England, have invented certain new and useful Improvements in Tires; and we do hereby declare that the following is a full, clear, and exact description of the same.

This invention relates to resilient tires more especially applicable to bicycle-wheels, although capable of use generally; and its object is to produce a resilient metal tire in which the resiliency or spring shall be distributed continuously throughout every part of the circumference thereof and the detail construction of which is of a simpler nature than that of resilient metal tires hitherto produced.

This invention consists of a tire composed of a number of separate rings or tires of metal of a resilient nature, such as spring-tempered steel, and of small section and of such a number when placed side by side that they will form one tire of combined rings of the necessary width for the weight to be carried by the vehicle. The separate rings making up the tire are flexibly bound together in such a manner as to allow within certain limits independence of motion to each ring in a radial direction and at the same time to have a combined resistance of all the rings to a side force on the edge of the tire parallel to the axle of the wheel and also that any radial motion of a ring will to some extent affect the whole circumference of that ring and be resisted by the flexible binding. The small spaces between the rings when they are placed in the cover may be packed with cord, leather, or other suitable material.

For full comprehension, however, of the invention reference must be had to the annexed drawings, forming a part of this specification, in which like symbols indicate corresponding parts, and wherein—

Figure 1 is a transverse section of our improved tire; Fig. 2, a side elevation of a bicycle-wheel provided therewith; Fig. 3, a transverse section of a modified form of tire; Figs. 4 and 5, respectively, a transverse section and a part side elevation of another modification thereof; Fig. 6, a transverse section of a further modification of the tire; Figs. 7 and 8, respectively, a transverse section and a part side elevation of another modification of the tire; and Figs. 9, 10, 11, and 12, transverse sections of other modifications thereof, Fig. 13, illustrating in cross-section various forms of tire-forming rings; Fig. 14, a detail diagrammatical view of a tire constructed according to our invention from a single continuous length of metal. Fig. 15 illustrates in plan view a blank from which our improved tire may be formed; Figs. 16 and 17, transverse and longitudinal vertical sectional views, respectively, of a tire thus formed; Figs. 18, 19, and 20, transverse vertical sectional views of modified forms of tires constructed according to our invention; Fig. 21, a side elevation of the modified form of tire illustrated in Fig. 20. Fig. 22 illustrates in transverse section a wheel tire and rim embodying our improvements.

Fig. 1 represents a cross-section of a tire and rim of a wheel having twelve rings of U-section steel 1, suitably tempered and sewed or fixed by wire or cement to a cover 2, of canvas or leather or suitable material, which may be coated with waterproof coating of suitable nature. The cover is carried completely around from the outer to the inner side of the U-steel rings. An outer cover 3 of suitable material—say canvas or leather—is fitted with a rubber tread 4, or it may be of leather or fiber suitable for resisting wear. The tread of rubber or other material may be carried completely over the outer cover, if desired. This cover may be laced securely in position at 5 around the rim of the wheel 7. It has been found necessary in order to prevent too much side play of the tire to have strips of canvas or other material 6 attached diagonally and alternately, forming guys or stays from tire to rim at regular intervals, as shown in Fig. 2, wherein said guy-strips are shown by dotted lines 6.

A modification, Fig. 3, of the flexible binding is to incase the rings 1 separately in a cover 2, as shown, and instead of lacing to the outside of the rim 7 the cover is secured by strong cords 8 to said rim. The cords 8, as is obvious, constitute rings and are in a recess of the cover and not allowed to touch the rim, their use being to tighten the cover to the required degree of initial tension, the whole being covered by a suitable cover 8ª, preferably cemented to the rim and of similar construction to the cover already described.

A modification shown in Figs. 4 and 5 is, instead of entirely incasing the rings 1 in an inner cover, as shown in Fig. 1 or Fig. 3, to merely support or bind them at equal distances with small strips varied in size and number to suit the weight to be carried. These strips are split at the ends, so that one end may be secured to two adjacent rings, and two strips can secure eight rings at one position of the circumference of the rim 7 by being passed under the U-formed washer 9 and held in position by the screw bolt and nut 10. The required amount of initial tension is regulated by adjusting the screw-nuts 10, which pull the U-washer toward the rim 7. The rim 7 is made of narrower width than the combined tire, so that the outer supporting or binding strips 6 are inclined inward. This gives the required resistance to side motion of the tire with respect to the rim. The rings are also shown in increasing diameter from the outer edges toward the center of the combined tire, so that the outer surface of tread 4 is a curved surface, as shown. The outer cover may be similar to that already described and passed around the U-washer 9, or it may be fixed to the sides of the two outer edge rings of the combined tire and the space between the rim and tire left open.

Fig. 6 is a modification similar to last, showing rings of larger section U shape and the number reduced to four. The rim 7 is much reduced in section in proportion to the rings, the flexible binding being similar to those already described. Fig. 7 shows a method of attaching the strips 6 to the rings 1 without passing anything over the outside surface of the rings. The ends of the strips 6 have a loop formed on them or holes made to receive a small wire or tube 11, and the U-sectioned wire is pressed around them, so as to partly encircle them and secure them in position. The strips 6 on one side of the rim are shown connected to alternate rings, and thereby assist in resistance to side forces. Under the U-washer 9 is placed a soft pad or washer 12 of any suitable material, such as cork or rubber, which will allow of the U-washer 9 being screwed well down. The said pad or washer acts to keep the U-washer and screw in place when the pressure of the ground releases the tension of the strip 6.

Fig. 9 shows a modification in which the flexible strips 6 are endless rings of any flexible material of a suitable nature, such as canvas and rubber or leather, the inner circumferences sewed or fixed by other means to an endless wire 2 of small diameter and are secured by the screwed hook and nut 10.

Fig. 10 is a modification where the rim is dispensed with and U-washers 9 are made suitable for screwed nipples or nuts 13, into which the spokes 14 of the wheel are secured, the strips 6 and cover being made as before described for the other modifications, or the strips 6 may be dispensed with and the rings 1 secured only by the outer cover. This may also be followed out in any of the other modifications already described.

Fig. 11 is a modification to give greater resiliency to the tire. Small rings 1 are connected by strips 6 of canvas or other suitable material in any of the methods already described to the rings 2, which have the curved edge toward the rim. The strips 6 are fixed to the rings 2 by washer, nut, and screw. Similar strips 6, connected to the screw 4 in any suitable manner, have the ends brought around the washer 7 and fixed by nut and screw to the rim 3. The cover or tread of rubber or other suitable material may be brought around the washer 7 and fixed by the screw and nut inside the rim 3, or it may be fixed in any other suitable manner.

Figs. 12 and 13: In any of the foregoing figures we may reverse the U-section, as shown in Fig. 12; also, we may use other forms of spring tempered or other resilient metal, as shown in Fig. 13.

In Fig. 14 is illustrated a preferred form of connecting the rings or sections together and wherein the said rings or sections are formed from one continuous length 20 of metal coiled spirally and having its ends preferably secured to the cover, although they may be crossed either over the outside or inside of the coil and connected together.

An alternative manner of connecting the rings together and what we consider will under some circumstances be more advantageous is illustrated in Figs. 15, 16, and 17, and another alternative form is illustrated in Fig. 19.

In Figs. 15, 16, and 17 the tire is in one piece, either spun solid or joined by brazing or otherwise, and the corrugations are separated by slotting the metal connecting the corrugations together, as at 25, thus forming from a single piece of metal a complete tire consisting of a series of rings connected together by a series of bridge-pieces or links 26. A tire thus formed will preferably be provided with the usual tread-section 27 and connected to the rim of the wheel as follows:

A series of short tubular sections 28 (one only being shown) are each connected to the tire by a strap 29, taking around said tubular section and the portion of the tire adjacent thereto, while the tubular sections are each perforated near the ends thereof, as at 30, and the rim of the wheel correspondingly perforated, as at 31. A staple 32 is arranged with its screw-threaded legs taking through the perforations 30, and a pair of tubular and internally-screw-threaded nipples 33 are adapted to take through the perforations 31 and receive the ends of said screw-threaded legs of the staple.

In Fig. 18 the rings are illustrated as progressive in diameter toward the center of the groups, and in said progression the outer diameter of each ring, although smaller than the outer diameter of the ring next to it, is of larger diameter than the inner diameter of said adjacent ring and is thereby secured against lateral play.

In Fig. 19 the rings are illustrated as bound together by a series of bands 36, passed alternately over and under the ring, each band being passed in an opposite direction over and under the rings to the band adjacent thereto.

Figs. 20 and 21 illustrate a thick strap 37, of leather or similar material, with the rings fixed to it by wires, as before described, such strap passing over a small washer 38 and nipple 39 on the spokes 40 of the wheel, while the portions of the strap may be bound together by a band 41, of metal, leather, or the like, which band may also be adjustable for tension, if desired.

In the foregoing methods it is not necessary that we adhere exactly to the precise number of rings as shown in the various figures, but may use two or more rings in a tire, as is found most suitable for the purpose for which said tire is required.

In any of the methods shown the small spaces between the rings, when they are placed in the cover, may be packed with cord, leather, or other suitable material.

Having thus particularly described our invention and the manner of performing the same, we have to state that we do not restrict ourselves to the precise details herein described or delineated and that we do not claim to have invented every separate detail or minor arrangement that we have had occasion to refer to; but What we believe to be novel and original and claim is as follows:

1. In combination with a wheel, a resilient tire of greater diameter than the rim of the wheel-body, two or more rings intermediate of said tire and wheel-body and closely encircling said rim, and flexible means for connecting said tire to said rings.

2. In combination with the rim of a wheel, a resilient metallic tire of sufficiently greater diameter than the rim of the wheel-body to provide a free space between said tire and rim, two or more rings intermediate of said tire and rim and closely encircling said rim, and flexible textile means for connecting said resilient metallic tire to said rings.

3. In combination with the rim of a wheel, a resilient metallic wheel-tire of sufficiently greater diameter than the rim of the wheel-body, to provide a free, complete circumferential, space between said tire and rim; two or more rings intermediate of said tire and rim and closely encircling said rim, guy-strips formed of single strips of canvas, or the like, extending transversely of said tire and connecting same to said rings.

4. In combination with the rim of a wheel, a resilient metallic wheel-tire of sufficiently greater diameter than the rim of the wheel-body, to provide a free complete circumferential space between said tire and rim; two or more rings intermediate of said tire and rim and closely encircling said rim, guy-strips formed of single strips of canvas or the like, extending transversely of said tire and connecting same to said rings; and an independent tension device adapted to act upon each of said guy-strips for the purpose set forth.

5. A wheel-tire composed of a number of resilient rings arranged side by side and concentric with the wheel-hub, a flexible binding or cover for the rings; guy-strips extending from the tire to the rim of the wheel and formed of single strips of canvas or the like slitted to allow portions thereof to extend in different directions, an outer cover for the whole, and a tread of rubber or the like secured to such outer cover, for the purpose set forth.

6. A wheel-tire composed of a number of resilient rings of semitubular cross-section arranged side by side and concentric with the wheel-hub, a flexible binding or cover for the rings, guy-strips extending from the tire to the rim of the wheel, and formed of single strips of canvas or the like, slitted to allow portions thereof to extend in different directions, an outer cover for the whole, and a tread of rubber or the like secured to such outer cover for the purpose set forth.

7. A wheel-tire comprising a series of rings connected together at their adjacent edges, said rings and connections being formed integral with one another, and connected to the rim of the wheel by means of a series of tubular sections, a staple having its legs screw-threaded and taking through perforations in each of said tubular sections, a pair of interiorly-screw-threaded nipples taking through the rim of the wheel and adapted to receive the ends of said screw-threaded legs, for the purpose set forth.

8. In combination with the rim and spokes of a wheel, a tire comprising a series of rings, a nipple and washer mounted adjustably upon each of said spokes, a strap taking over and connected to said rings and connected to said washer, for the purpose set forth.

9. In combination with the rim and spokes of a wheel, a tire comprising a series of rings, a nipple and washer mounted adjustably upon each of said spokes, a strap taking over and connected to said rings and connected to said washer, and a tension-band 41, adapted to inclose said strap, for the purpose set forth.

10. In combination with the rim and spokes of a wheel a tire comprising a series of rings, a nipple and washer mounted adjustably upon each of said spokes, a strap taking over and connected to said rings and connected to said washer, and an adjustable tension-band 41, adapted to inclose said strap, for the purpose set forth.

CHARLES GEORGE ROBERTON.
JAMES JACKSON ROBERTON.

Witnesses as to signature of Charles George Roberton:
 CECIL E. PRESTON,
 W. E. HEGHES.

Witnesses as to signature of James Jackson Roberton:
 HAMILTON TURNER,
 JOSH. HY. WHITAKER.